(12) United States Patent
McCune, Jr. et al.

(10) Patent No.: US 7,983,643 B2
(45) Date of Patent: Jul. 19, 2011

(54) FREQUENCY DEMODULATION WITH THRESHOLD EXTENSION

(75) Inventors: Earl W. McCune, Jr., Santa Clara, CA (US); Richard W. D. Booth, San Jose, CA (US)

(73) Assignee: Panasonic Corporation, Osaka (JP)

( * ) Notice: Subject to any disclaimer, the term of this patent is extended or adjusted under 35 U.S.C. 154(b) by 631 days.

(21) Appl. No.: 12/167,478

(22) Filed: Jul. 3, 2008

(65) Prior Publication Data

US 2010/0002807 A1    Jan. 7, 2010

(51) Int. Cl.
*H04B 1/10* (2006.01)

(52) U.S. Cl. ......... 455/254; 455/266; 455/207; 375/346

(58) Field of Classification Search ............... 455/205, 455/207, 210, 211, 213, 254, 266; 375/319, 375/334, 346
See application file for complete search history.

(56) References Cited

U.S. PATENT DOCUMENTS

| | | | | |
|---|---|---|---|---|
| 3,611,169 | A * | 10/1971 | Hess et al. | 329/319 |
| 3,742,361 | A * | 6/1973 | Wason | 455/207 |
| 3,792,357 | A * | 2/1974 | Hekimian et al. | 455/43 |
| 3,983,488 | A * | 9/1976 | Bush et al. | 455/208 |
| 4,035,730 | A * | 7/1977 | Clayton | 455/210 |
| 4,101,837 | A * | 7/1978 | Clayton et al. | 348/727 |
| 4,254,503 | A | 3/1981 | Vance | |
| 4,339,828 | A * | 7/1982 | Chasek | 455/205 |
| 5,034,695 | A * | 7/1991 | Owen | 329/325 |
| 5,303,411 | A * | 4/1994 | Stengel et al. | 455/254 |
| 5,572,164 | A * | 11/1996 | Kasperkovitz et al. | 329/315 |
| 6,094,101 | A | 7/2000 | Sander et al. | |
| 6,219,394 | B1 | 4/2001 | Sander | |
| 6,269,135 | B1 | 7/2001 | Sander | |
| 6,738,606 | B1 * | 5/2004 | Kianush et al. | 455/254 |

OTHER PUBLICATIONS

E.W. McCune, Extended Phase-Shift Keying, Ph.D. Dissertation, Electrical and Computer Engineering, University of California, Aug. 1998.

* cited by examiner

*Primary Examiner* — Blane J Jackson

(57) ABSTRACT

A frequency demodulator comprises a frequency discriminator configured to generate a frequency modulation signal from frequency modulated signal, circuitry for generating a phase modulation signal from the frequency modulation signal, and a click reduction signal processing (CRSP) circuit operable to remove noise enhancements from the phase modulation signal caused by clicks. By first converting the frequency modulation signal to a phase modulation signal, noise enhancements caused by clicks are more readily distinguished from other noise in the phase modulation signal. After the noise enhancements have been removed by the CRSP, the frequency modulation is recovered substantially free of clicks. Removal of the clicks results in an improved output signal-to-noise ratio, thereby advantageously extending the onset of the threshold effect.

16 Claims, 9 Drawing Sheets

FREQUENCY DEMODULATION WITH THRESHOLD EXTENSION

FIELD OF THE INVENTION

The present invention relates to demodulating communications signals. More specifically, the present invention relates to methods and apparatus for extending the onset of the threshold effect in frequency demodulators.

BACKGROUND OF THE INVENTION

Frequency-shift keying (FSK) is a commonly-used frequency modulation scheme in which information is transmitted over a communications link by way of discrete frequency changes made to a carrier signal. FSK transmitters are inexpensive to manufacture and have inherently high efficiency. However, FSK demodulators, which are needed to demodulate the FSK modulated signals at the receiving end of the communications link, have several disadvantages.

One disadvantage relates to the fact that conventional FSK demodulators are difficult to manufacture in integrated circuit (IC) form. Forming the FSK demodulator in an IC is desirable since it lowers manufacturing costs and results in a compact design that consumes significantly less power than a nonintegrated implementation. Unfortunately, conventional FSK demodulators include circuit components that are difficult to integrate using standard IC fabrication processes. For example, many FSK demodulators include slope detectors, ratio detectors or quadrature multipliers, all of which employ some sort of high-Q tuned analog circuit. Incorporating these high-Q tuned analog circuits in standard IC fabrication processes is difficult, and usually results in substantial yield losses and hard-to-control and undesirable part-to-part performance variations.

Other FSK demodulation approaches employ a monostable integrator or a delay flip-flop (DFF). The monostable integrator approach requires an accurate pulsewidth of a small fraction of the demodulation carrier frequency. The level of accuracy required makes it difficult to integrate. The DFF-based approach, while more easy to integrate than the other approaches, is only capable of operating on signals having a very high FSK modulation index h (i.e., an h much greater than 1). The DFF-based FSK demodulator includes a quadrature demodulator which serves to control the logic output of the DFF depending on whether the frequency of the received FSK modulated signal is lower than or higher than a local oscillator frequency. In order for the quadrature demodulator to accurately generate the control signals for the DFF, there must be sufficient phase rotation during each data bit interval of the received FSK modulated signal. However, in low-modulation index applications, such as Bluetooth where the modulation index is only about 0.3, insufficient phase rotation may be available per data bit interval for the DFF-based FSK demodulator to work properly. Another limitation of the DFF-based FSK demodulator is that the bit rate must be maintained at a rate less than or equal to the FSK frequency deviation imposed on the carrier signal. These constraints limit practical application of the DFF-based FSK demodulator to low-data-rate, high-modulation-index applications.

In addition to the specific problems associated with the various FSK demodulation approaches discussed above, all FSK demodulators exhibit a phenomenon known as the "threshold effect." At a pre-demodulation SNR (or "input SNR") called the "FM threshold," the post-demodulation SNR (or "output SNR") begins to degrade much more rapidly than the pre-demodulation SNR. Because a low output SNR results in data errors at the output of the demodulator, it is highly desirable to extend the onset of this threshold. Unfortunately, as the input SNR decreases, it becomes increasingly more difficult to extend the threshold, due to the presence of what are known as "clicks". Clicks are noise events that enhance the additive noise generated in the demodulation process. At low input SNRs the resulting noise enhancements become the dominant noise source and, consequently, pose a limit on the ability to extend the onset of the threshold effect.

Considering the foregoing drawbacks and limitations of prior art FSK demodulation approaches, it would be desirable to have an FSK demodulator that is amenable to integration, capable of operating on both low and high modulation index signals, and effective at extending the onset of the threshold effect.

BRIEF SUMMARY OF THE INVENTION

Methods and apparatus for extending the onset of the threshold effect in frequency demodulators are disclosed. An exemplary method includes receiving a frequency modulated signal (such as a frequency-shift-keying (FSK) modulated signal), demodulating the frequency modulated signal to provide a frequency modulation signal, transforming the frequency modulation signal into a phase modulation signal, removing click-induced noise enhancements from the phase modulation signal, and recovering a frequency modulation signal substantially free of the click-induced noise enhancements.

An exemplary demodulator comprises a frequency discriminator configured to generate a frequency modulation signal from a frequency modulated signal, circuitry for generating a phase modulation signal from the frequency modulation signal, and a click reduction signal processing (CRSP) circuit operable to remove noise enhancements from the phase modulation signal caused by clicks. By first converting the frequency modulation signal to a phase modulation signal, noise enhancements caused by clicks are more readily distinguished from other noise in the phase modulation signal. This simplifies the design of the CRSP circuit. With the noise enhancements removed, the frequency modulation can then be recovered substantially free of clicks. The resulting increase in output SNR advantageously extends the onset of the threshold effect, thereby effectively increasing the communication range for the same transmitter output power, or reducing the transmitter output power required for the same communications range.

Further features and advantages of the present invention, as well as the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 1:
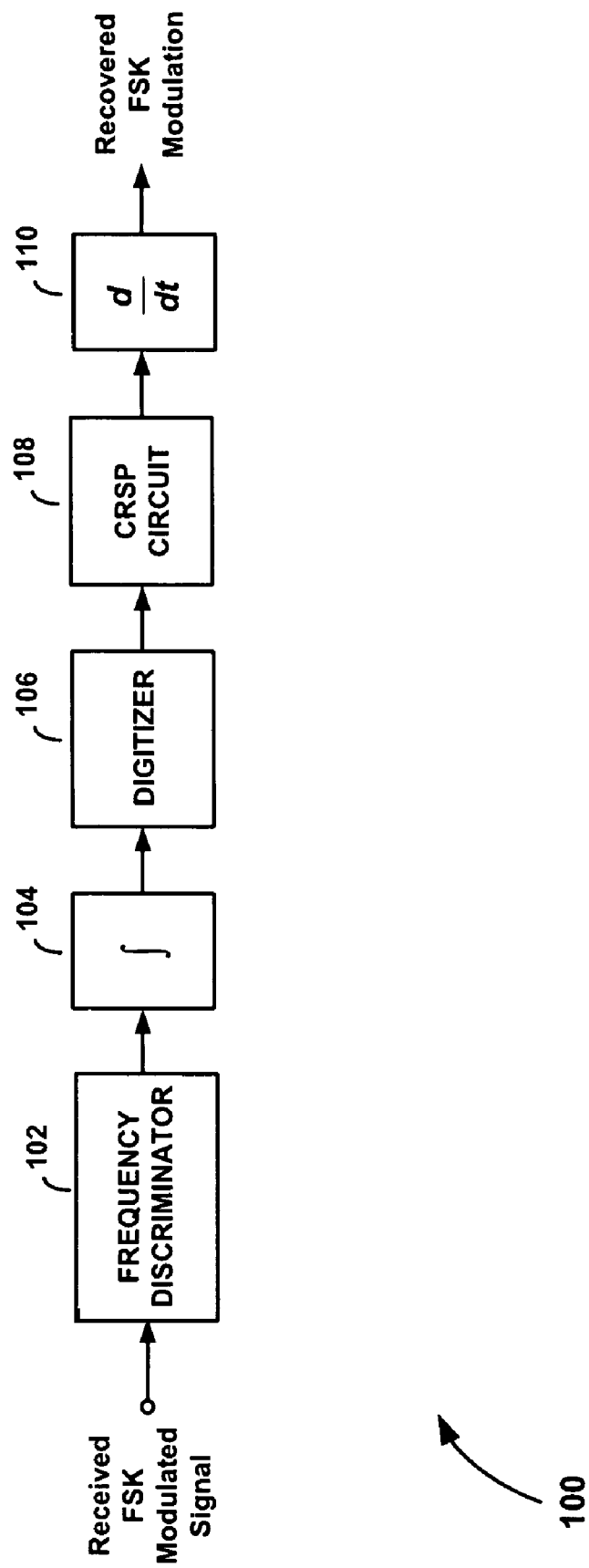
FIG. 1 is a drawing of an FSK demodulator, according to an embodiment of the present invention.

Referring to FIG. 1, there is shown an FSK demodulator 100, according to an embodiment of the present invention. The FSK demodulator 100 comprises a frequency discriminator 102, an integrator 104, a digitizer 106, a click reduction signal processing (CRSP) circuit 108, and a differentiator 110.

The frequency discriminator 102 is operable to sample a received FSK modulated signal and produce an FSK modulation signal having levels corresponding to the different FSK modulation states. The FSK modulation signal is integrated by the integrator 104 to generate a phase shift keying (PSK) modulation signal having phase modulation states corresponding to the different FSK modulation states. As will be explained in more detail below, performing this initial phase demodulation process, allows the CRSP circuit 108 to more easily detect and remove noise enhancements caused by clicks. Once the noise enhancements have been removed by the CRSP circuit 108, the "cleaned" phase modulation signal is differentiated to recover an FSK modulation signal that is substantially free of clicks.

Figure 2:
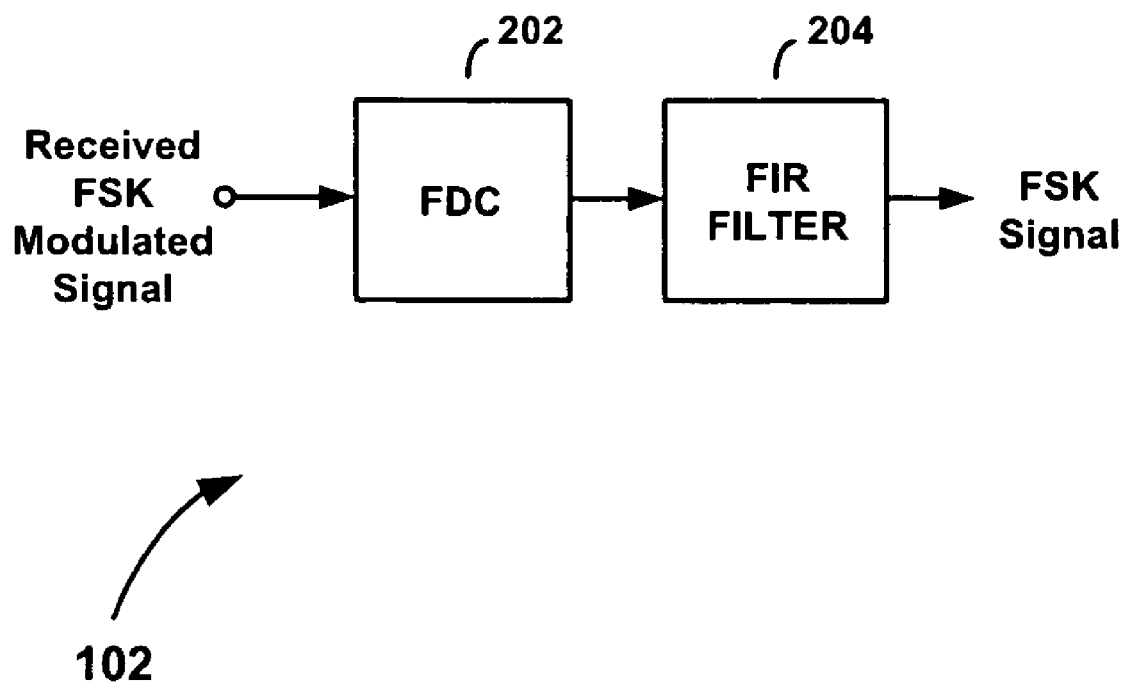
FIG. 2 is a drawing illustrating how a frequency-to-digital converter (FDC) and a digital filter may be used to implement the frequency discriminator of the FSK demodulator in FIG. 1.

According to one embodiment, the frequency discriminator 102 comprises a frequency sampling circuit and a digital filter, both of which can be implemented in a variety of different ways. FIG. 3 illustrates, for example, how the frequency sampling circuit is implemented using a frequency-to-digital converter (FDC) 202 and the digital filter is implemented using a finite impulse response (FIR) filter 204, similar to as described in U.S. Pat. Nos. 6,094,101 and 6,219,394, which are hereby incorporated by reference. The FDC 202 operates to sample the received FSK modulated signal and produce a digital data stream of logic "1s" and "0s" representing the frequency modulation. The FIR filter 204 filters the digital data stream, in effect averaging samples in the data stream to provide a signal having levels that correspond to the different modulation states of the FSK modulation. The approach in FIG. 2 is just one approach to demodulating the received FSK modulated signal. Other sampling circuits and filtering approaches may be used, as will be appreciated and understood by those of ordinary skill in the art.

Depending on the input SNR ratio of the received FSK modulated signal and the level of additive noise generated during the frequency detection process, the FSK modulation signal at the output of the frequency discriminator 102 may include clicks. The integrator 104 serves to convert the FSK modulation signal to a phase modulation signal (or, more specifically, a phase-shift-keying (PSK) signal). Converting the modulation to the phase domain allows the effects of the clicks (i.e., click-induced noise enhancements) to be more readily distinguished from other noise in the signal.

Figure 3A:
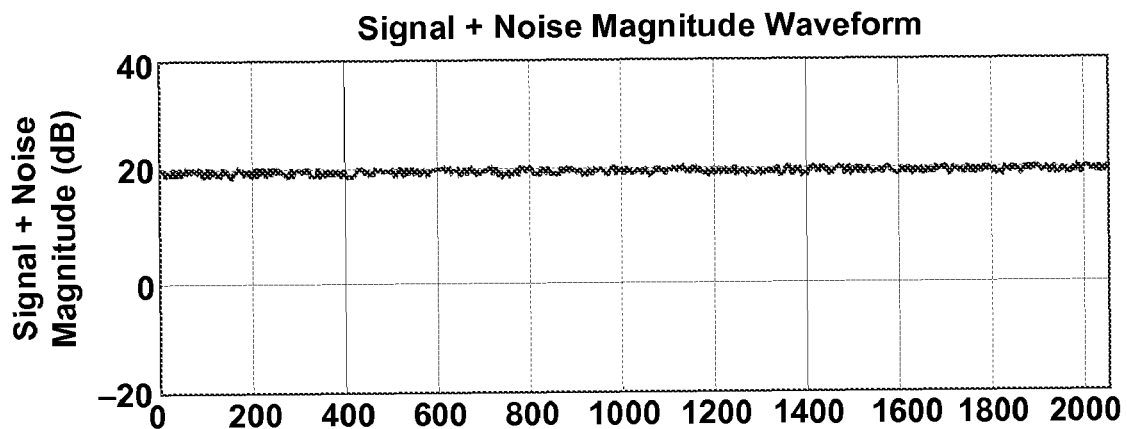
FIGS. 3A-C are simulation results of a phase modulated signal under the influence of noise, showing the signal+noise magnitude, angle and phase waveforms, respectively, when the signal power is ten times greater than the noise power.
Figure 3B:
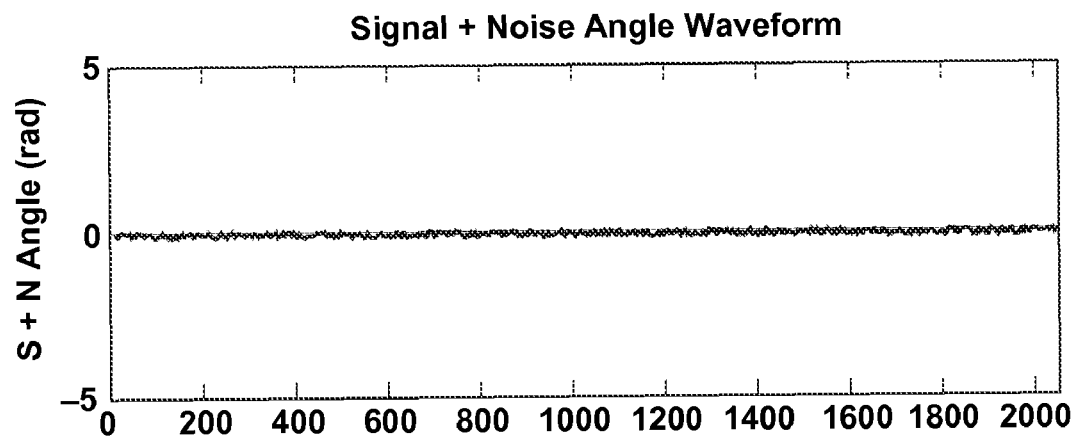
Figure 3C:
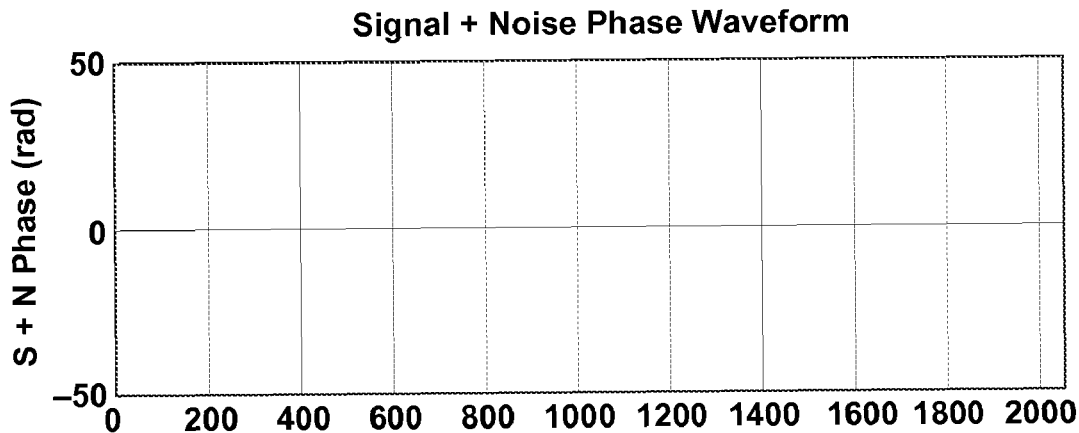

The click-induced noise enhancements can be better understood by reference to FIGS. 3A-C and 4A-C, which are MATLAB simulation results comparing the effects of clicks for different input SNRs of a phase modulated+noise signal. In obtaining the simulation results in FIGS. 3A-C, a Gaussian noise source and phase modulator were used to form a signal+noise waveform having a constant phase modulation of $-\pi/2$. The signal level of the phase modulated signal was adjusted so that SNR was 20 dB (i.e., 10:1). The magnitude of the resulting signal+noise waveform is shown in FIG. 3A. FIGS. 3B and 3C show the angle and phase of the signal+noise, respectively. (Note that the "phase" and "angle" are not synonymous here. Phase is theoretically unbounded, ranging from $-\infty$ and $+\infty$, while angle is the projection of the phase onto a two-dimensional plane and is bounded between $+/-180°$ (i.e., $+/-\pi$ radians)). When the SNR is high, as in FIG. 3A, FIGS. 3B and 3C show that both the signal+noise angle and signal+noise phase are essentially flat at zero radians, as expected for a constant phase modulation of $-\pi/2$. Hence, clicks do not have a substantial impact on the signal phase when the input SNR is high.

Figure 4A:
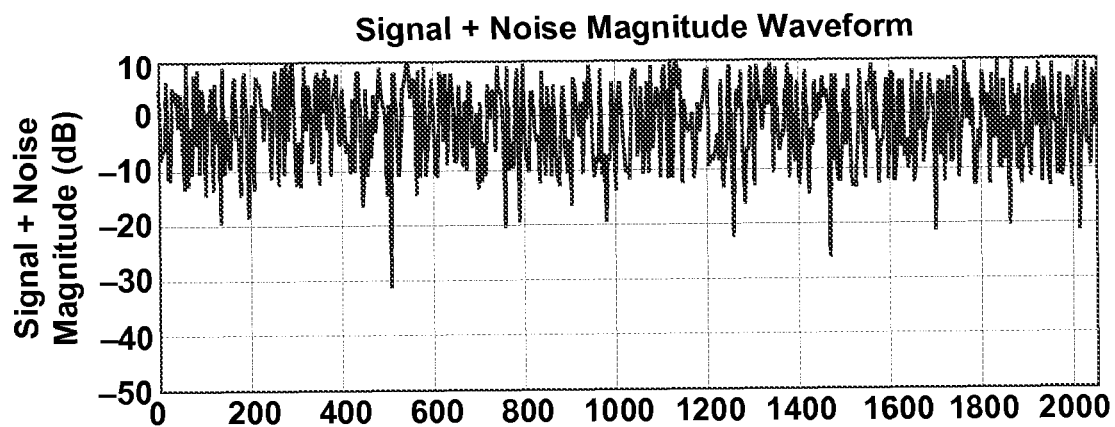
FIG. 4A-C are simulation results of a phase modulated signal under the influence of noise, showing the signal+noise magnitude, angle and phase waveforms, respectively, when the signal power is equal to the noise power.
Figure 4B:
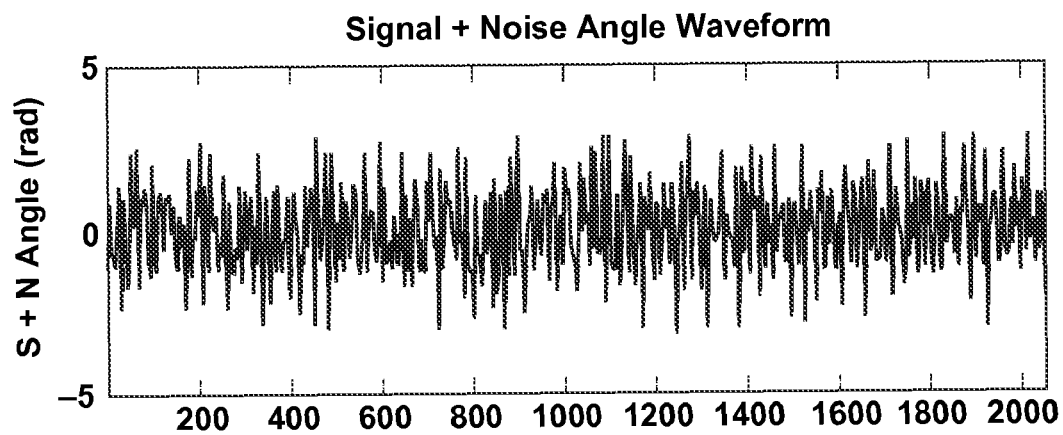
Figure 4C:
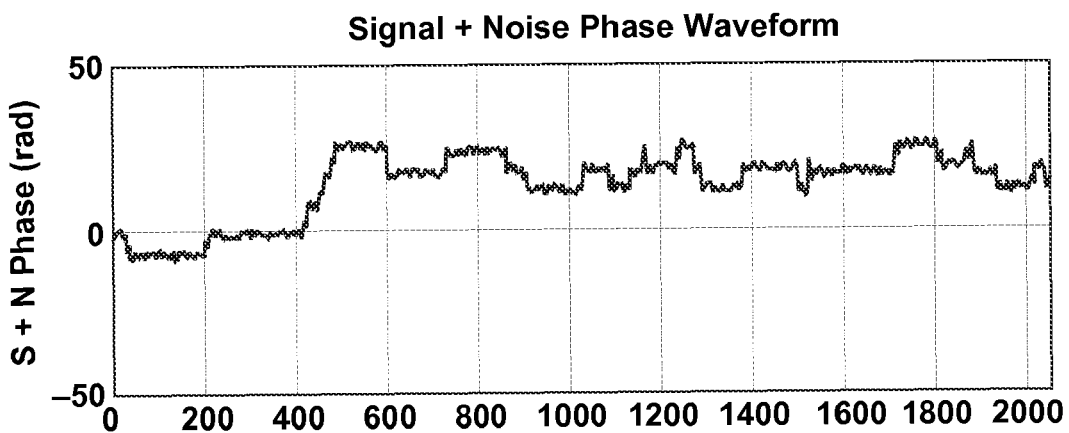

FIGS. 4A-C show simulation results obtained from using the same level of noise and constant phase modulation as used in the simulations for FIGS. 3A-C, but with the signal level reduced so that the SNR was lowered to 0 dB (i.e., 1:1). FIG. 4A shows the magnitude of the resulting signal+noise waveform, and FIGS. 4B and 4C show the resulting signal+noise angle and signal+noise phase waveforms, respectively. Comparing FIGS. 4A and 4B to FIGS. 3A and 3B, it is seen that the impact of the additive noise on the phase modulated signal is more pronounced. More significantly however, is what is revealed in the signal+noise phase waveform in FIG. 4C. When the signal+noise waveform in FIG. 4B is "unwrapped" to reveal the signal+noise phase waveform in FIG. 4C, rapid phase jumps (or "phase rotations") can be seen in the signal+noise phase waveform. These phase rotations are noise enhancements caused by clicks, and are seen to be always either $+360°$ or $-360°$ (i.e., $+/-2\pi$ radians). In order to extend the onset of the threshold effect, it is highly desirable to remove the $+360°$ and $-360°$ phase rotations.

Figure 5:
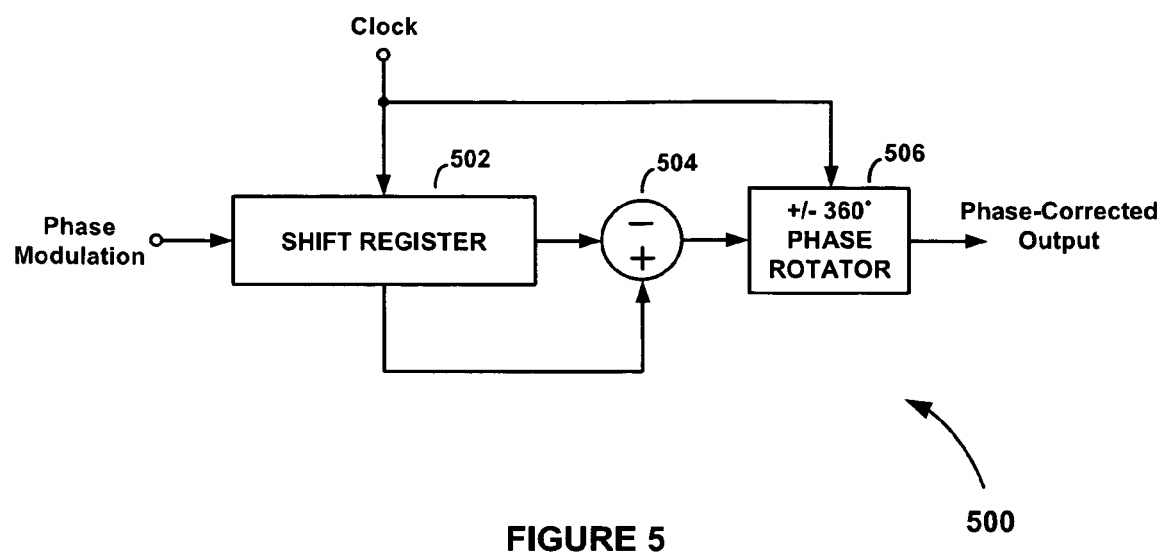
FIG. 5 is drawing of an exemplary click reduction signal processing (CRSP) circuit, which may be used to implement the CRSP circuit of the FSK demodulator in FIG. 1.
Figure 6:
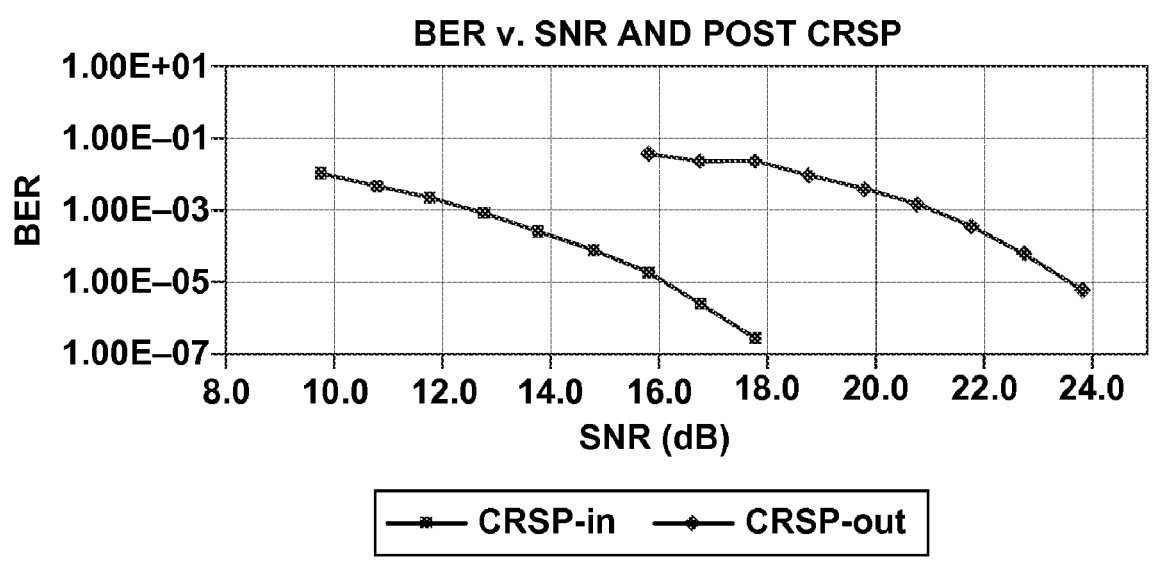
FIG. 6 is a graph of bit error rate (BER) as a function of input signal-to-noise ratio (SNR) for a phase modulation signal before and after being processed by a CRSP circuit.

According to one embodiment of the invention, the phase modulation signal at the output of the integrator 104 is digitized by the digitizer 106 and then operated on by the CRSP circuit 108 to remove the click-induced $+360°$ and $-360°$ phase rotations from the phase modulation signal. FIG. 5 is a drawing of an exemplary CRSP circuit 500 that may be used for this purpose. The CRSP circuit 500 comprises a shift register 502 configured to receive the digitized phase modulation signal, a subtractor 504, and a phase shifter (or "+/- 360° phase rotator") 506. The CRSP circuit 500 is configured to operate based on the fact that noise enhancements due to clicks are always revealed in the form of one of two possible phase rotations—either $+360°$ or $-360°$—whereas the desired phase modulation includes only a finite number of possible symbol-to-symbol phase rotations, all of which have absolute values of less than 360°. Accordingly, the CRSP circuit 500 needs only detect $+360°$ and $-360°$ phase rotations in the phase modulation signal, and then add or subtract $+360°$ of phase from the signal in order remove the undesired click-induced noise enhancements. The CRSP circuit 500 does this by performing a "sliding window" function, in which the subtractor 504 subtracts samples of the digitized phase modulation signal at the output of the shift register 502 from samples at other points along the shift register 502. When the subtraction indicates that either a +360° or −360° phase rotation is present in the phase modulation signal, the +/−360° phase rotator 506 operates to remove the phase rotation by adding or subtracting 360° of phase from the signal.

After the +360° and −360° phase rotations have been removed, the "cleaned" digitized phase modulation signal is differentiated by the differentiator 110 to recover an FSK modulation signal substantially free of clicks. With the clicks removed, the SNR of the recovered FSK modulation is substantially higher than it would be without the benefit of being subjected to the CRSP circuit 500. In other words, employing the CRSP circuit 500 has the effect of advantageously extending the onset of the threshold effect. The extended threshold allows the communication range between a transmitter and a receiver containing the FSK demodulator 100 to be increased for the same transmitter output power. Alternatively, it allows the transmitter output power to be significantly reduced for the same communication range.

Figure 7:
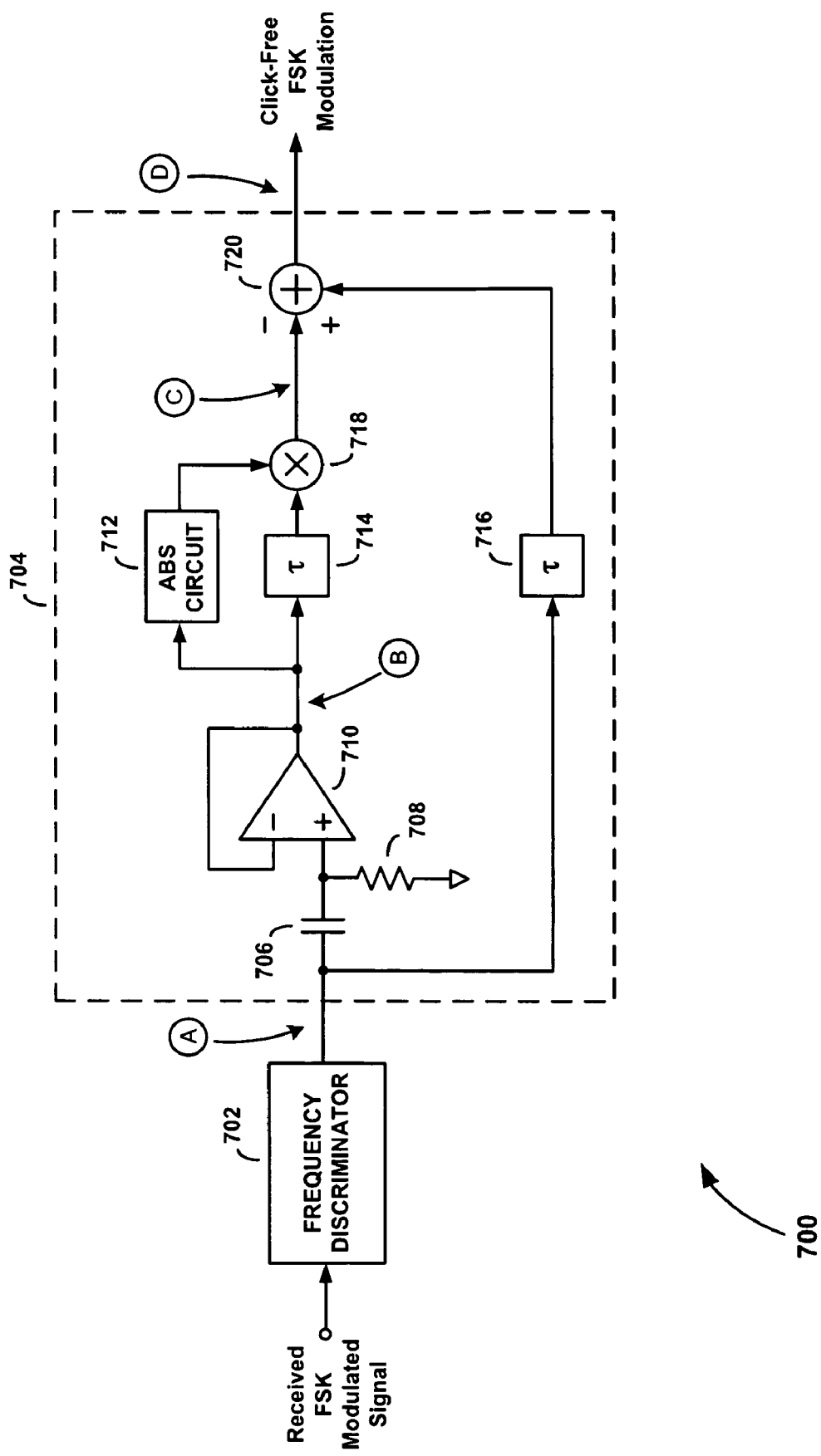
FIG. 7 is drawing of an FSK demodulator, according to another embodiment of the present invention.

FIG. 7 is a graph showing bit error rate (BER) v. SNR simulations results of a phase modulation signal before (i.e., without) and after (i.e., with) being processed by a CRSP circuit. As can be seen, the SNR with click removal (CRSP-out curve) is substantially higher than without click removal (CRSP-in curve). In fact, for a given BER, 7-8 dB of link margin is seen to be recovered. This is equivalent to changing the transmitter output power by the same amount. For example, for a 100 mW transmitter, the output power can be reduced by a factor of five or more.

In addition to providing superior link performance, the FSK demodulator 100 avoids the need for difficult-to-integrate circuit components such as high-Q tuned circuits. It is also adaptable to different data rates and capable of operating at high speeds and on narrow deviation signals (i.e., low-modulation-index signals) such as those used in Bluetooth radio applications, for example.

Whereas the FSK demodulator 100 in FIG. 1 employs a digital CRSP circuit 500, click reduction can be alternatively performed in the analog domain. FIG. 7 is a drawing of an FSK demodulator 700 that employs an analog click removal circuit 704, according to an alternative embodiment of the present invention. The FSK demodulator 700 comprises digital or analog frequency discriminator 702 and the analog click removal circuit 704. The frequency discriminator 702 is implemented similar to the frequency discriminator 102 of the FSK demodulator in FIG. 1. The clip removal circuit 704 comprises a high-pass filter made up of a coupling capacitor 706 and resistor 708, an operational amplifier (op-amp) 710, an absolute value (ABS) circuit 712, first and second delay elements 714 and 716, a multiplier 718, and a differencer 720.

FIGS. 8A-D are timing diagrams illustrating waveforms at different nodes of the click removal circuit 704. The signal at node A (FIG. 8A) is the FSK modulation signal appearing at the output of the frequency discriminator 702. In this example, the FSK modulation is binary FSK, so the FSK signal changes between one of two voltage levels depending on the data pattern in the received FSK modulated signal. The FSK modulation signal is also seen to include clicks 802, which are to be removed by the click removal circuit 704.

Figure 8A:
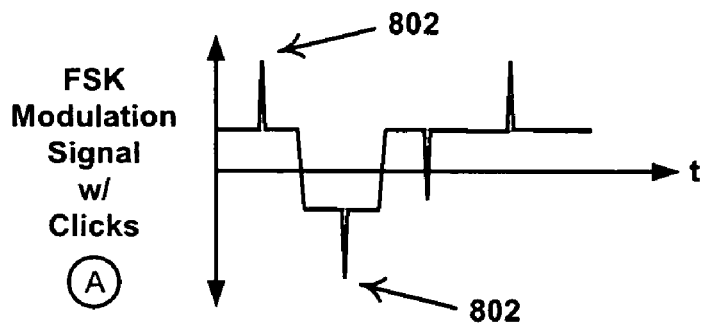
FIGS. 8A-D are timing diagrams illustrating the click removal process performed by the FSK demodulator in FIG. 7.
Figure 8B:
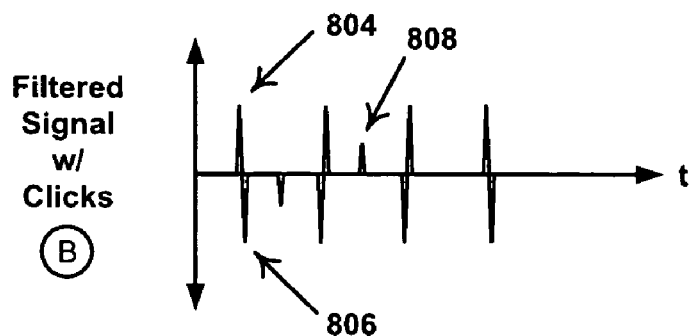

The high-pass filter (capacitor 706 and resistor 708) removes the low-frequency content from the FSK modulation signal, and also operates as a differentiator. Because each click includes a rising and falling edge, the differentiation results in a positive click 804 and corresponding negative 806 click for each of the clicks in the unfiltered FSK modulation signal. The time X between each pair of positive and negative clicks is set by the bandwidth of the part of the receiver driving the frequency discriminator (e.g., an intermediate frequency filter). Smaller data transition spikes 808 corresponding to the data transitions in the FSK modulation signal are also generated during the differentiation process. The filtered signal is passed through the op-amp 710. The resulting filtered signal is shown in FIG. 8B.

Figure 9:
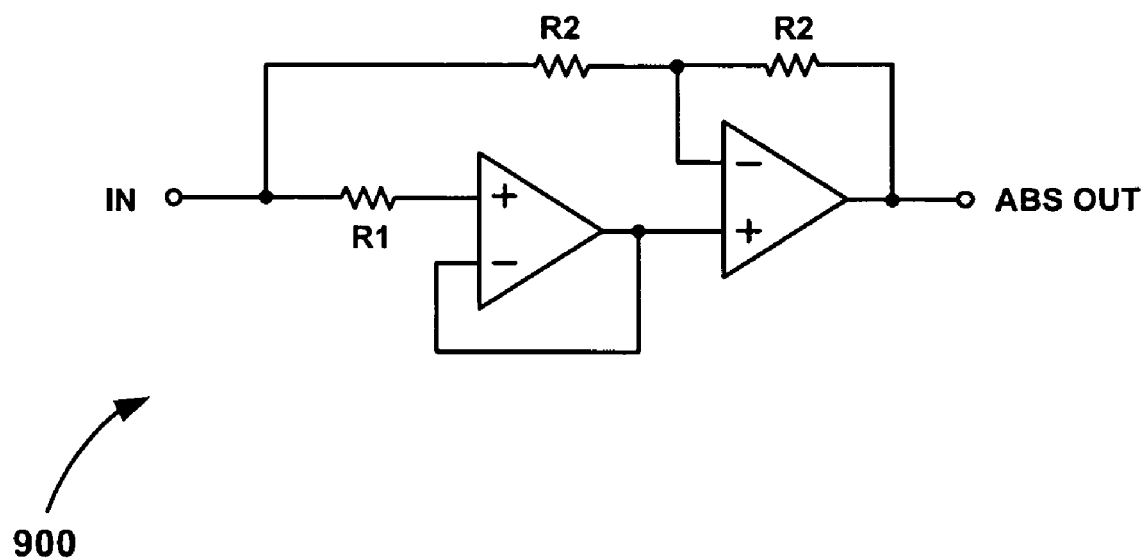
FIG. 9 is a drawing of a known absolute value (ABS) circuit, which can be used to implement the ABS circuit of the click removal circuit in FIG. 7.

The filtered signal at node B is coupled to the input of the ABS circuit 712 and also to the input of the first delay element 714. The first delay element 714 delays the filtered signal from node B and couples the delayed signal to a first input of the multiplier 718. The ABS circuit 712 operates to generate an absolute value signal of the filtered signal from node B. The ABS circuit 712 can be implemented using known methods. FIG. 9 is an example of a known ABS circuit 900 that may be used.

Figure 8C:
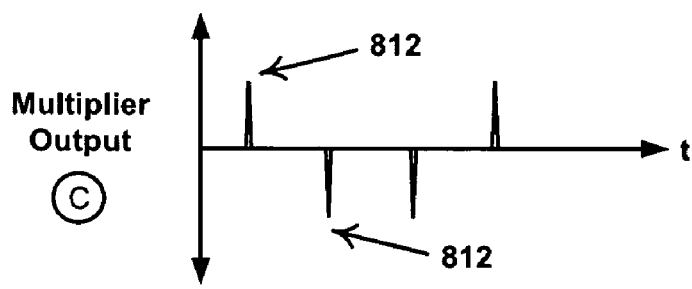

The multiplier 718 combines the delayed and absolute value signals to produce a signal containing clicks 812 corresponding to the clicks in the original FSK modulation signal at node A. The resulting signal at node C is shown in FIG. 8C. Note that the time it takes to generate the absolute value signal and combine it with the delayed version of the filtered signal occurs within a time τ. The output of the ABS circuit 712 is zero for all other times, including the times corresponding to the data transition spikes 808. In this manner, the data transition spikes 808 generated by the high-pass filter are not propagated to the output of the multiplier 718.

Figure 8D:
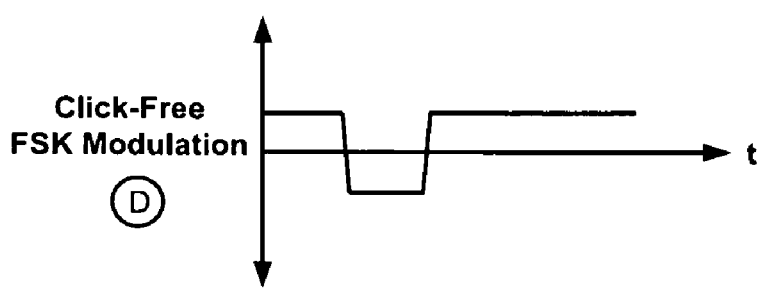

The second delay element 716 delays the FSK modulation signal at node A, to provide a delayed FSK modulation signal that is in phase with the signal appearing at the output of the multiplier 718. Finally, the differencer 720 subtracts the signal appearing at the output of the multiplier 718 with the delayed FSK modulation signal at the output of the second delay element 716. The result is an FSK modulation signal substantially free of clicks, as shown in FIG. 8D.

The present invention has been described with reference to specific exemplary embodiments. These specific exemplary embodiments are merely illustrative, and are not meant to restrict the scope or applicability of the present invention in any way. For example, while the exemplary embodiments have been described in the context of FSK, the same or similar principles are generally applicable to any type of frequency demodulation. Various modifications or changes to the specific exemplary embodiments will also be suggested to those of ordinary skill in the art. Accordingly, the spirit and scope of the present invention should be construed as being limited only by the terms of the appended claims.

What is claimed is:

1. A method of extending the onset of the threshold effect in a frequency demodulator, comprising:
   demodulating a frequency modulated signal to provide a frequency modulation signal;
   transforming said frequency modulation signal into a phase modulation signal; and
   removing noise enhancements caused by clicks from said phase modulation signal to produce a noise-corrected phase modulation signal substantially free of click-induced noise enhancements.

2. The method of claim 1, further comprising recovering said frequency modulation from said noise-corrected phase modulation signal.

3. The method of claim 1 wherein demodulating said frequency modulated signal comprises sampling said frequency modulated signal to produce a data stream representing said frequency modulation.

4. The method of claim 3, further comprising filtering said data stream to produce a filtered signal having levels corresponding to different modulation states in said frequency modulation signal.

5. The method of claim 4, further comprising:
digitizing said filtered signal; and
digitally removing said noise enhancements.

6. The method of claim 5 wherein digitally removing said noise enhancements comprises digitally detecting and removing +360° or −360° phase rotations in said phase modulation signal.

7. A demodulator apparatus, comprising:
a frequency discriminator configured to receive a frequency modulated signal and produce a frequency modulation signal;
an integrator configured to receive said frequency modulation signal and produce a phase modulation signal; and
a click reduction circuit configured to remove noise enhancements from said phase modulation signal caused by clicks.

8. The demodulator apparatus of claim 7 wherein said frequency discriminator comprises:
a frequency-to-digital converter (FDC) configured to sample said frequency modulated signal and produce a digital data stream; and
a digital filter configured to generate said frequency modulation signal from the digital data stream.

9. The demodulator apparatus of claim 7 wherein said click reduction circuit comprises a digital circuit.

10. The demodulator apparatus of claim 9 wherein said digital click reduction circuit is configured to remove noise enhancements caused by clicks by detecting and removing +360° or −360° phase rotations from said phase modulation signal.

11. A demodulator apparatus, comprising:
means for generating a frequency modulation signal from a frequency modulated signal;
means for converting said frequency modulation signal into a phase modulation signal; and
means for removing click-induced noise enhancements from said phase modulation signal.

12. The demodulator apparatus of claim 11 wherein said means for generating a frequency modulation signal comprises:
a frequency-to-digital converter (FDC) configured to generate a digital data stream; and
a digital filter configured to generate said frequency modulation signal from said digital data stream.

13. The demodulator apparatus of claim 11 wherein said means for removing click-induced noise enhancements comprises means for digitally removing said click-induced noise enhancements.

14. The demodulator apparatus of claim 13 wherein said means for digitally removing click-induced noise enhancements comprises means for detecting and removing +360° or −360° phase rotations from said phase modulation signal.

15. A method of reducing noise, comprising:
demodulating a frequency modulated signal to provide a frequency modulation signal;
transforming said frequency modulation signal into a phase modulation signal; and
removing noise from said phase modulation signal, wherein said removing noise comprises detecting and removing +360° or −360° phase rotations in said phase modulation signal.

16. A demodulator apparatus, comprising:
a frequency discriminator configured to receive a frequency modulated signal and produce a frequency modulation signal;
an integrator configured to receive said frequency modulation signal and produce a phase modulation signal; and
a noise reduction circuit configured to remove noise by detecting and removing +360° or −360° phase rotations from said phase modulation signal.

* * * * *